(12) United States Patent
Sohlberg

(10) Patent No.: US 6,499,583 B1
(45) Date of Patent: Dec. 31, 2002

(54) APPARATUS AND A METHOD FOR FEEDING ARTICLES

(76) Inventor: Örjan Sohlberg, Pl 7975, Smedjebacken (SE), SE-777 91

( * ) Notice: Subject to any disclaimer, the term of this patent is extended or adjusted under 35 U.S.C. 154(b) by 67 days.

(21) Appl. No.: 09/716,084

(22) Filed: Nov. 17, 2000

(51) Int. Cl.7 .............................................. B65G 47/24
(52) U.S. Cl. ....................... 198/374; 198/375; 198/398; 198/411
(58) Field of Search ................................ 198/398, 374, 198/375, 401, 411, 416, 418

(56) References Cited

U.S. PATENT DOCUMENTS

| | | | | |
|---|---|---|---|---|
| 3,739,902 A | * | 6/1973 | Ingram et al. ............... | 198/374 |
| 4,522,292 A | * | 6/1985 | Euverard et al. ......... | 198/339.1 |
| 4,578,926 A | * | 4/1986 | Sato et al. .................. | 198/406 |
| 4,683,707 A | * | 8/1987 | Koyama ...................... | 156/542 |
| 4,759,434 A | * | 7/1988 | Dorner .................. | 198/457.02 |
| 5,145,049 A | * | 9/1992 | McClurkin .................. | 198/374 |
| 5,439,098 A | * | 8/1995 | Bonnet ........................ | 198/831 |

OTHER PUBLICATIONS

AMF Bakery Systems, "Pulver Product Orientor Loader",.

\* cited by examiner

*Primary Examiner*—Joseph E. Valenza
*Assistant Examiner*—Gene O. Crawford
(74) *Attorney, Agent, or Firm*—Dilworth & Barrese LLP.

(57) ABSTRACT

An apparatus for feeding articles to an accumulation area (4) is provided to have a conveyor path with a curved section (7) interconnecting a first conveyor path section (8) in the feeding direction upstream of the curved section (7) and a second conveyor path section (9) downstream thereof and extending substantially in parallel with each other. The apparatus further provides for transferring (10) the articles from the first section transversely to the feeding direction and over to the second section, by-passing the curved section, and a control arrangement (28) for controlling transfer to optionally transfer articles from the first to the second conveyor path section by-passing the curved section, or allowing the articles to pass through the curved section.

33 Claims, 12 Drawing Sheets

APPARATUS AND A METHOD FOR FEEDING ARTICLES

BACKGROUND OF THE INVENTION AND PRIOR ART

The present invention relates to an apparatus for feeding articles to an accumulation area comprising at least one conveyor for feeding the articles forming a conveyor path to said area and means for optionally turning said articles by substantially 180 degrees for shifting end for end before the articles arrive to said accumulation area, as well as a method for feeding articles to an accumulation area, in which the articles are optionally turned by substantially 180 degrees for shifting end for end before arriving to said accumulation area.

The invention is directed to feeding articles of any type to an area for accumulation thereof, but it will hereinafter be explained for the case of feeding articles in the form of bread, preferably having an elongated shape, such as loaves, to an area, where they are accumulated, preferably for being loaded into a box being placed in said area according to a desired pattern.

Thus, the invention relates to such a feeding apparatus making it possible to have articles fed to the accumulation area with a certain orientation or changing this orientation by substantially 180 degrees. This may for instance be done for having the openings of plastic bags enclosing said articles directed towards each other when the articles are to be arranged in two parallel rows in said accumulation area. This may for instance be desired for protecting these openings from external influences, such as by the walls of a box or container into which they are to be loaded.

A known apparatus of this type includes a turntable arranged in said conveyor path, so that a conveyor will feed the articles to the turntable and a pusher will push the articles onto the turntable, whereupon the turntable will turn by 180 degrees and then the pusher will push the articles off the turntable onto a conveyor located in the conveyor path downstream thereof. As an alternative the articles may be pushed by said pusher or rake over the turntable without being turned. A disadvantage of this apparatus is that the pushing of the articles onto and off the turntable is time consuming, so that the number of articles possible to be fed per time unit to said accumulation area will decrease as a consequence of the provision of said turntable for making said turning possible.

Another apparatus of this type has a turntable provided with recesses for wheels arranged on driven axles, so that the turntable part of the conveyor path will also act as a conveyor when the wheels are driven. Accordingly, no pusher is needed for feeding the articles over said turntable. When articles are to be turned the turntable is lifted so much that the wheels will no longer extend through said recesses, and the turntable may then be turned. A disadvantage of this apparatus is that the wheels provide a comparatively small support surface for said articles in comparison with for instance a belt conveyor, and if for instance loaves enclosed in plastic bags are fed, a bag may erroneously be fed or get stuck in a wheel disturbing the entire procedure and possibly requiring an interruption of the operation of the apparatus, which is troublesome and also may involve costs.

SUMMARY OF THE INVENTION

An object of the present invention is to provide an apparatus of the type defined in the introduction, which is improved in at least some aspect with respect to such apparatuses already known.

This object is according to the invention obtained by providing such an apparatus, in which said conveyor path has a curved section interconnecting a first conveyor path section in the feeding direction upstream of the curved section and a second conveyor path section downstream thereof extending substantially in parallel with each other, the apparatus further comprising means for transferring said articles from said first section transversely to the feeding direction of the latter over to said second section by-passing said curved section and a control arrangement adapted to control said transferring means to optionally transfer articles from the first to the second conveyor path section by-passing the curved section or letting them pass through the curved section.

This means that said articles may very efficiently, i.e. rapidly, without any delay caused by said turning be fed to said accumulation area by feeding the articles through said curved section or take a short-cut by said transferring means resulting in an automatic turning of the articles by 180 degrees with respect to the articles passing through said curved section. It is pointed out that "transferring" here is defined as a translatory movement of the articles in the direction in question. It is possible to rapidly obtain many different patterns of articles in said accumulation area. This will be achieved for articles of varying shapes in a reliable manner by using covered conveyors, such as belt converors instead of wheels According to a preferred embodiment of the invention said transferring means is adapted to push the articles from said first section to said second section.

It is also preferred to arrange means for optionally accumulating articles conveyed through the conveyor path before the transversal transfer thereof by said transferring means for transferring a plurality of articles simultaneously. This may for instance be accomplished by providing a separate conveyor of the conveyor path controllable to move stepwise for accumulating a new article for each step.

According to another preferred embodiment of the invention the apparatus also comprises means for optionally turning said articles by substantially 90 degrees before the articles arrive to said accumulation area. This is a preferred feature, since it makes it possible to obtain a larger variety of accumulation pattern in said accumulation area for for instance loading the articles in a desired way in a box or container.

Said means for optionally turning said articles by substantially 90 degrees is advantageously operable to select turning direction, clockwise or counter-clockwise, for the articles, increasing the flexibility of the apparatus to form different patterns of articles in said accumulation area even more.

According to another preferred embodiment of the invention said means for optionally turning articles by substantially 90 degrees is adapted to be controlled to form an obstacle to be hit by the articles thus turning them. and this means comprises according to another preferred embodiment of the invention an arm arranged laterally to the conveyor path and introducable into the conveyor path for being hit by said articles.

According to another preferred embodiment of the invention the apparatus further comprises additional means for optionally transferring articles being in a mid-portion of said curved section extending substantially perpendicularly to said first and second sections in a direction being substantially in parallel with said first and second sections onto an intermediate support surface separating said first and second section. This means that these articles will then theoretically have been turned by substantially 90 degrees when they are in said mid-portion with respect to their orientation in said first section and 90 degrees less than the orientation they would have in said second section when not transferred to said intermediate support surface. Accordingly, the articles will in this way also be turned by 90 degrees. Furthermore, the apparatus preferably comprises means for transferring articles from said intermediate support surface in a direction substantially perpendicular to the extension of said second section onto the latter.

According to another preferred embodiment of the invention the apparatus further comprises means for gathering articles located in said mid-portion by influencing them from both sides towards the centre of said mid-portion in a direction substantially perpendicular to the extension of said first and second sections before transferring them to said intermediate support surface by said additional transferring means. This means that a plurality of articles in this way turned by substantially 90 degrees may simultaneously be transferred to said intermediate support surface making it possible to obtain a high feeding speed without any noticeable delay caused by the turning resulting in this way.

According to another preferred embodiment of the invention the conveyor path is arranged to arrive to said first section through a part upstream thereof extending in substantially the same direction as the first section forming a prolongation thereof, and according to another preferred embodiment of the invention said conveyor path is continued downstream of said accumulation area by a part extending in substantially the same direction as said second section. These embodiments are advantageous, since they simplify the construction of the apparatus and makes parts of the conveyor path easily accessible.

According to another preferred embodiment of the invention said first, second and curved section of the conveyor path are formed by individually controllable conveyors. This means that it is possible to feed the articles differently in these sections for obtaining an optimum co-ordination of the movement of these conveyors for obtaining a certain pattern of articles in said accumulation area as fast and accurate as possible.

According to another preferred embodiment of the invention the apparatus comprises an intermediate conveyor arranged in a space separating said first and second section and having the same feeding direction as said second section. This is preferred, since this means that articles arriving on the intermediate support surface formed by this intermediate conveyor may be fed thereby in a direction in parallel with the feeding direction of the second section of the conveyor path.

The invention also provides a method for feeding articles according to the appended independent method claim. The advantage of such a method and the methods according to the preferred embodiments of the invention defined in the dependent method claims will be clear from the above discussion of the apparatus according to the present invention.

The invention also relates to a computer program and a computer readable medium according to the corresponding appended claims. It is easily understood that the method according to the invention defined in the appended set of method claims is well suited to be carried out through program instructions from a processor which may be influenced by a computer program provided with the program steps in question.

Further advantages as well as advantageous features of the invention will appear from the following description and the other dependent claims.

BRIEF DESCRIPTION OF THE DRAWINGS

With reference to the appended drawings, below follows a specific description of preferred embodiments of the invention cited as examples.

In the drawings.

DETAILED DESCRIPTION OF PREFERRED EMBODIMENTS OF THE INVENTION

Figure 1:
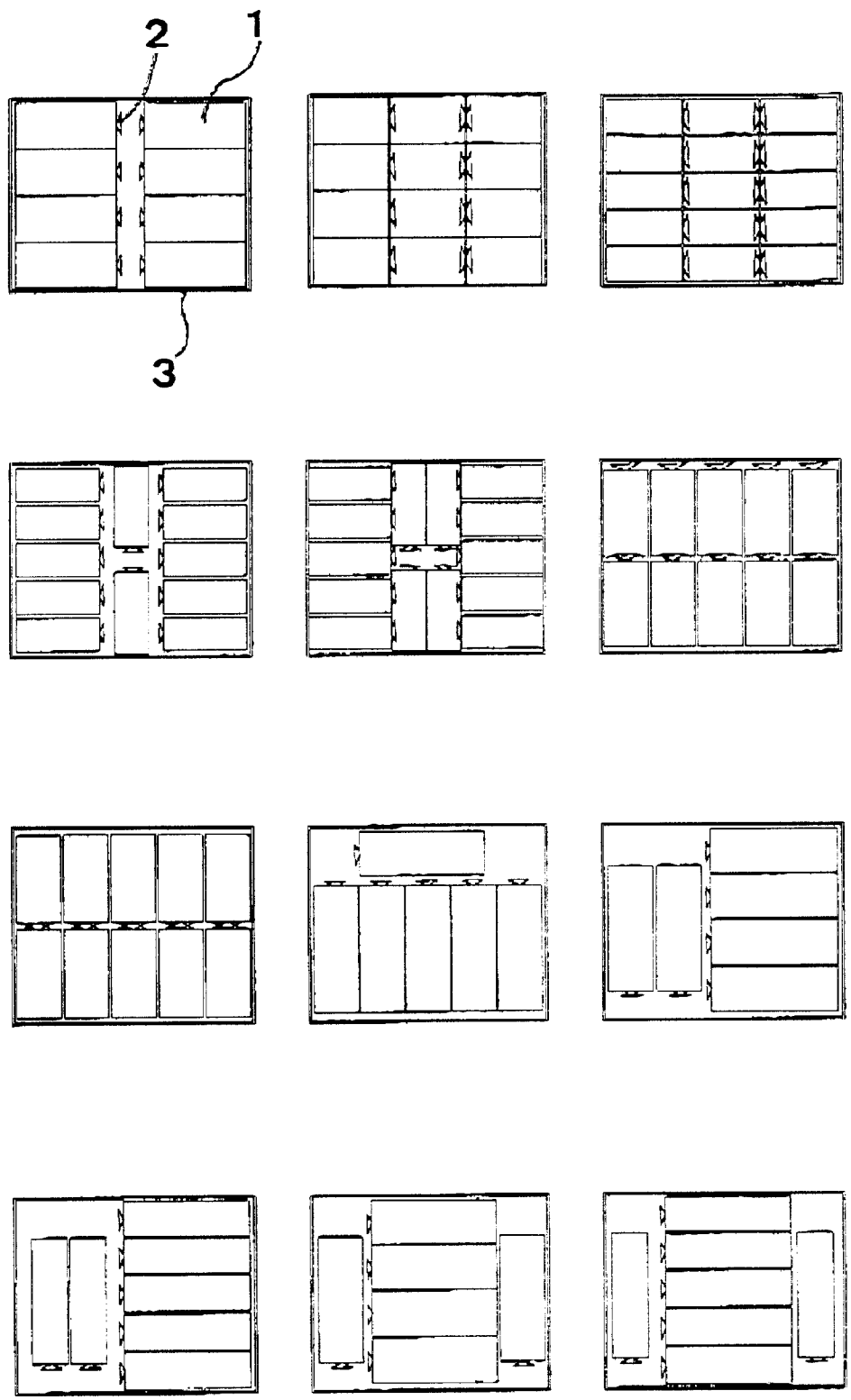
FIG. 1 is a schematic view illustrating a variety of different loading patterns which may be desired to be obtained through articles in an accumulation area through an apparatus according to the invention.

FIG. 1 shows different patterns of articles 1 in the form of bread loaves enclosed in plastic bags having openings at one end thereof indicated at 2 for loading into a box or container 3 in an accumulation area of an apparatus according to the invention described further below. It is shown how the articles may be differently positioned depending upon the dimensions thereof or other particular wishes, such as to turn the openings inwardly. All these patterns have in common that the articles extend substantially in parallel with two walls of the box, so that they may have four different orientations separated by 90 degrees.

Figure 2A:
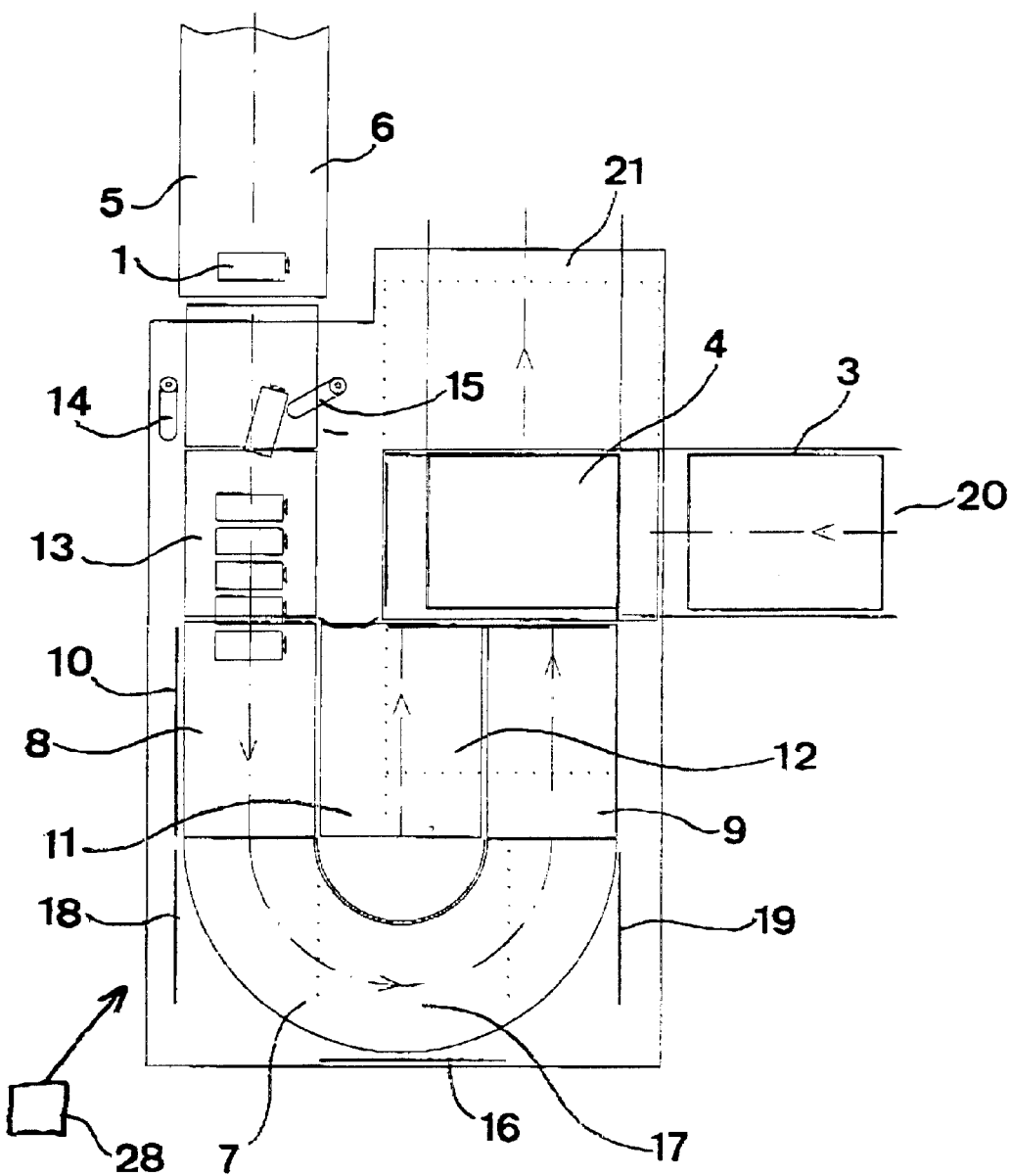
FIGS. 2a–2f are schematical views from above of an apparatus according to a first preferred embodiment of the invention in different stages of the operation thereof for illustrating the function of this apparatus.
Figure 2A:
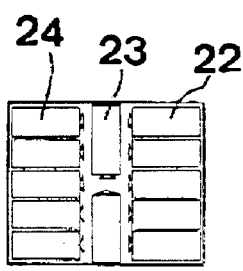

An apparatus according to a first preferred embodiment of the invention is schematically illustrated in FIG. 2a. FIGS. 2a–2f illustrate how this apparatus works for obtaining an article pattern shown in FIG. 2a in an accumulation area 4 of the apparatus. The apparatus comprises a conveyor path 5 for feeding the articles from an upstream conveyor 6 arriving from a bakery to the accumulation area 4 where articles are accumulated and loaded into boxes. The conveyor path is formed by a number of separate conveyors being individually controllable by a control arrangement 28 schematically indicated. The conveyor path comprises a curved section 7 formed by an individually controllable conveyor interconnecting a first conveyor path section 8, also formed by a separate individually controllable conveyor, and a second conveyor path section 9 formed by a separate individually controllable conveyor. The apparatus also comprises means in the form of a pusher or rake 10 for transferring said articles from said first section 8 transversely to the feeding direction of the latter over to said section 9 by-passing said curved section 7. The articles will then pass over an intermediate support surface 11 provided by an intermediate conveyor 12 individually controllable to feed articles in the same direction as said second section 9.

The apparatus also comprises accumulation means in the form of a conveyor 13 upstream of said first section controllable to move step-wise for accumulating a new article for each step.

Means for turning articles by substantially 90 degrees are provided in the form of arms 14, 15 arranged laterally to the conveyor path and which may be pivoted into said path for optionally forming an obstacle to the articles and turn them clockwise and counter-clockwise, respectively.

The apparatus also comprises means in the form of a pusher or rake 16 for optionally transferring articles being in a mid-portion 17 of said curved section extending substantially perpendicularly to said first and second sections in a direction being substantially in parallel with said first and said second sections onto the intermediate support surface 11 separating said first and second sections. Pushers 18, 19 are also arranged for gathering articles located in said mid-portion 17 by influencing them from both sides towards the centre of said mid-portion in a direction substantially perpendicular to the extension of said first and second sections before transferring them to said intermediate support surface 11 by said additional transferring means 16.

The apparatus also comprises a path 20 for feeding empty boxes or containers 3 into the accumulation area 4 for being filled with articles there and then fed by another conveyor 21 for further processing, such as storage or into transporting vehicles.

Figure 2B:
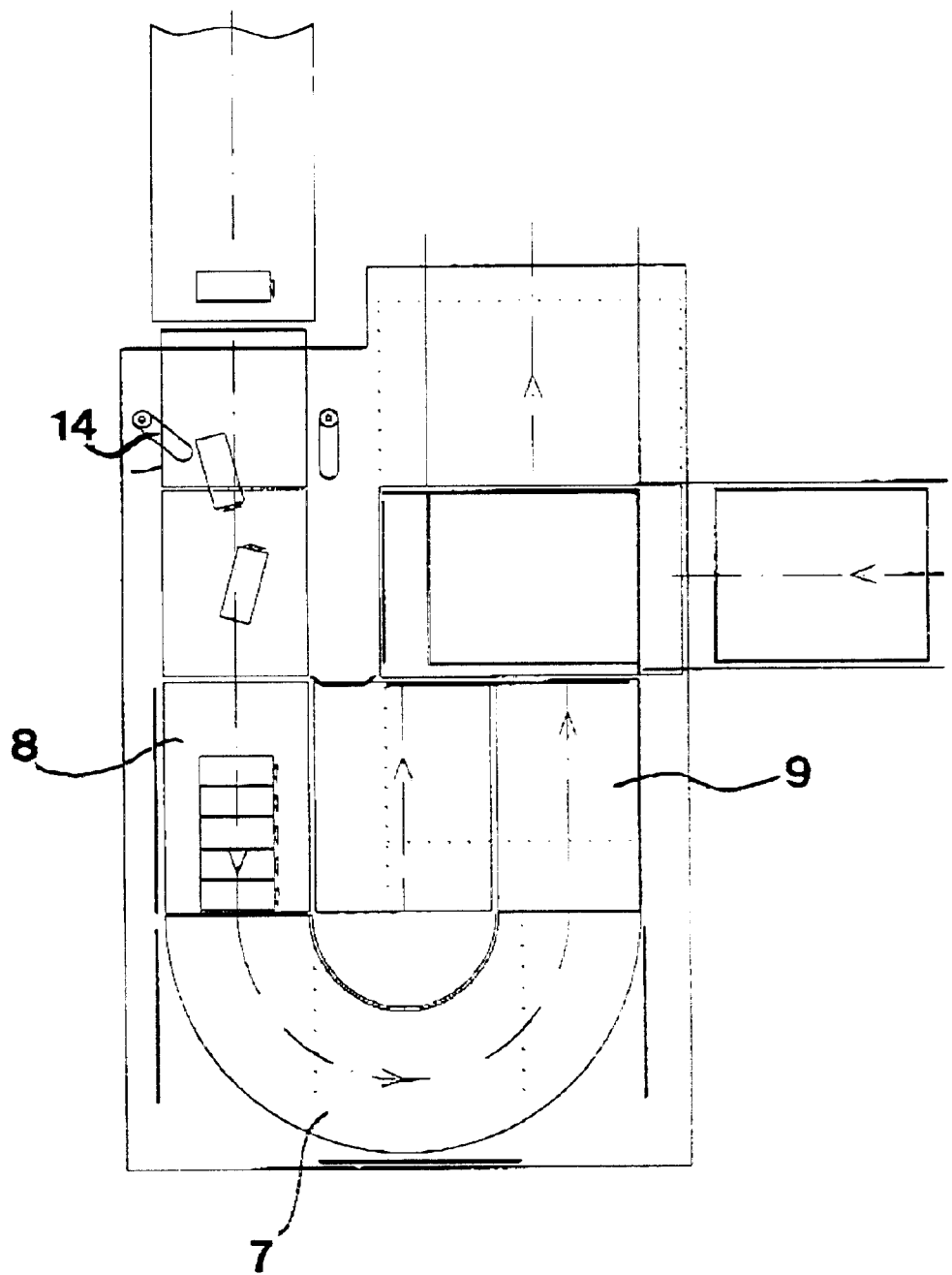
Figure 2C:
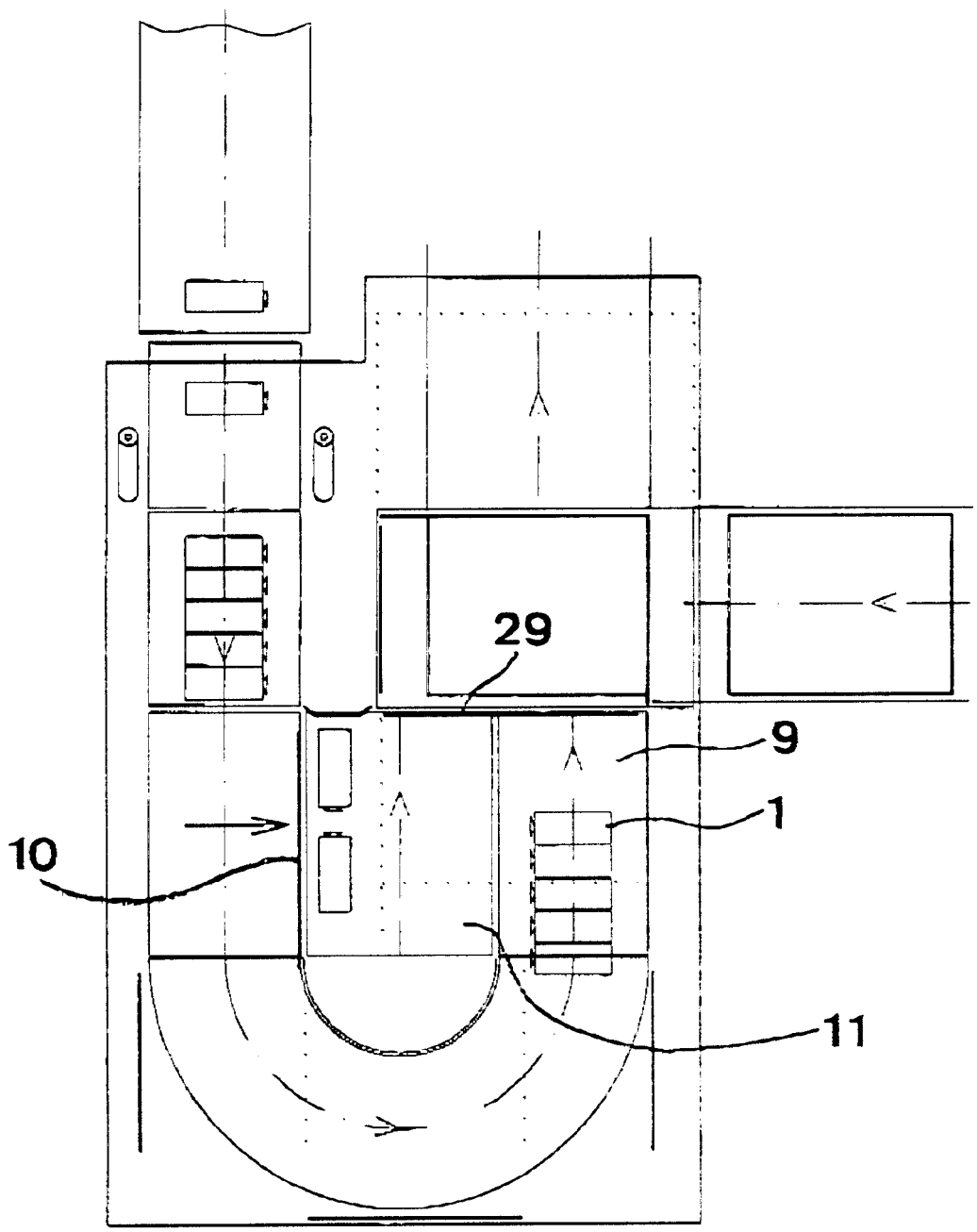
Figure 2D:
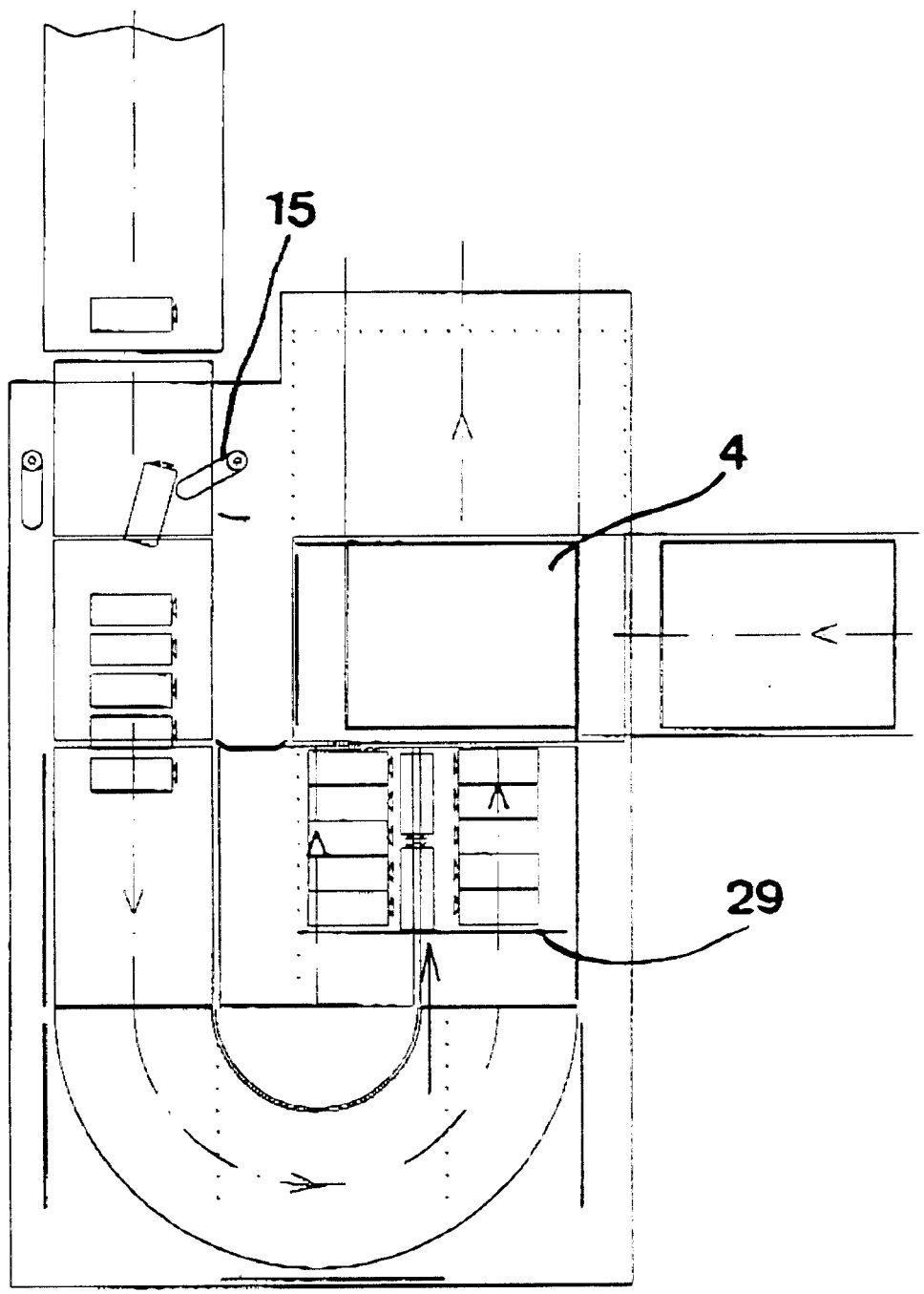
Figure 2E:
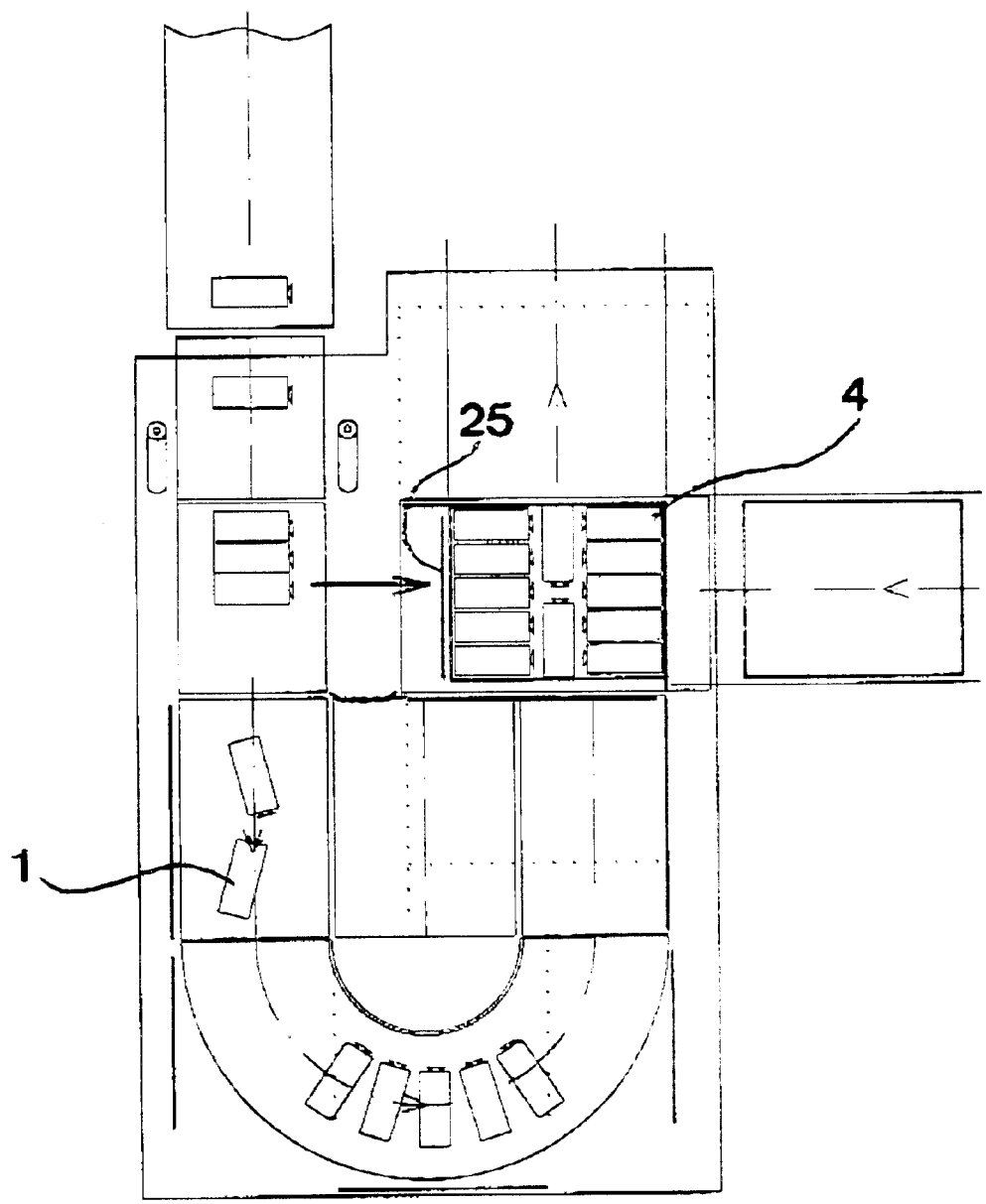
Figure 2F:
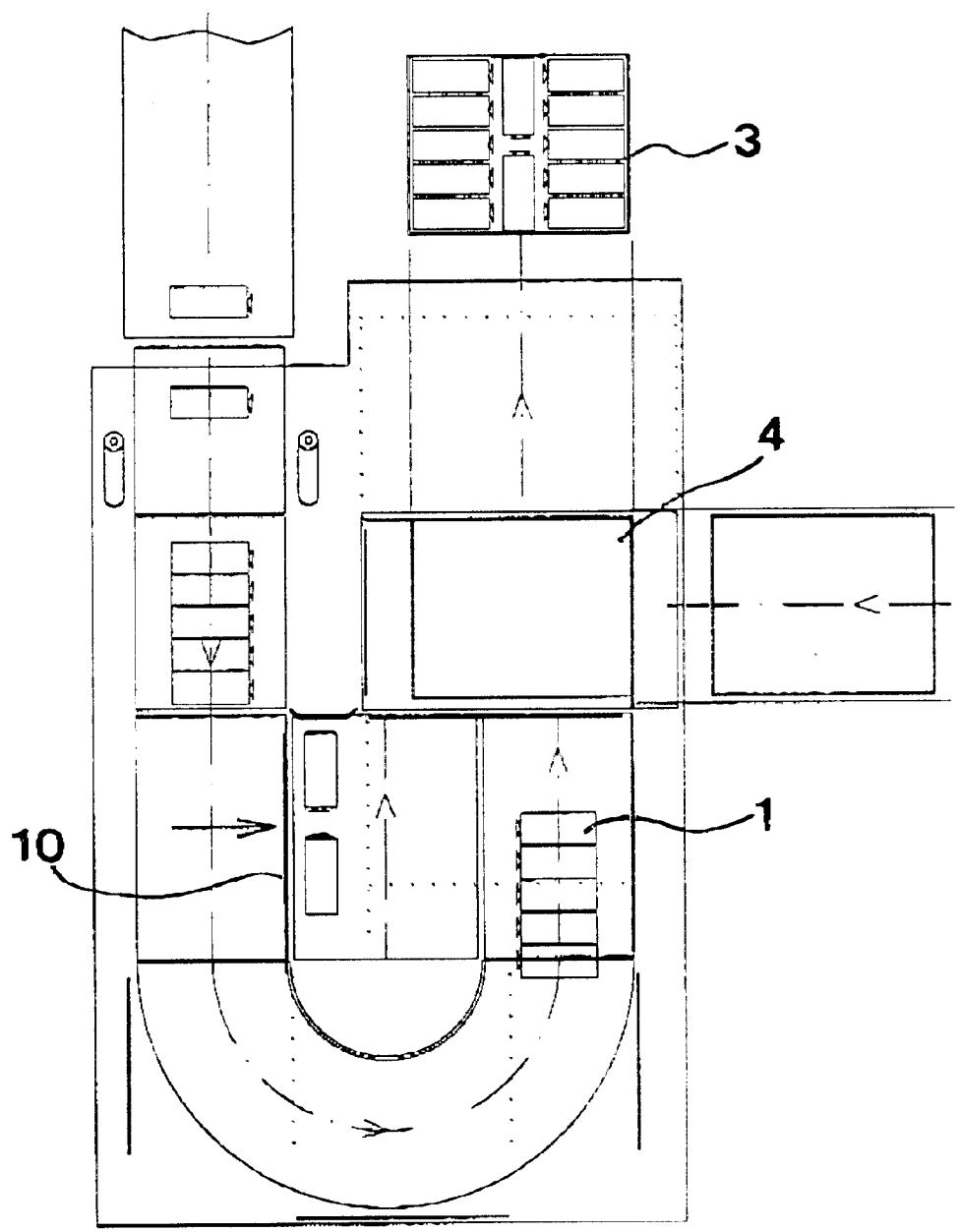

The function of this apparatus will be clear from the above description, but it will now described for two different loading patterns, although of course a variety of other patterns are obtainable thereby. The first loading pattern to be obtained is shown at the bottom of FIG. 2a. As shown, the articles in said pattern have four different orientations obtained in the following way: it is shown in FIG. 2b how a number of articles to form the right hand row 22 of said pattern is fed in the conveyor path through the first section, later on the curved section and then the second section. The following two articles are turned by substantially 90 degrees by the arm 15 and the arm 14, respectively, as shown in FIGS. 2a and 2b. When these articles 23 for the mid zone of the box arrives to said first section 8 the pusher 10 is controlled to transfer them onto the intermediate support surface 11 in the direction towards said second section 9. The next row 24 of articles is formed by pushing the articles in question when present on the first conveyor section 8 transversely onto the intermediate support surface 11 to the position shown in FIG. 2d. It is shown in FIGS. 2d and 2e how the intermediate conveyor 12 and the conveyor forming said second section 9 are then controlled to transport the articles into the accumulation area 4 where a box 3 is waiting to receiving them. This is combined with the action of a further pusher or rake 29 compressing the articles to lie close together by pushing them together in the feeding direction of the second section as seen in FIG. 2d. This pusher 29 will from the waiting position shown in FIG. 2c be lifted to a level making it possible to move it over the articles to come behind them for then being lowered and push them. FIG. 2e also shows how a further pusher 25 will bring the article pattern to the correct shape for fitting into the box. FIG. 2f shows how a filled box 3 will then be transported away. A rather complicated pattern has in this way been rapidly obtained by very simple and thereby also reliable means.

Figure 3A:
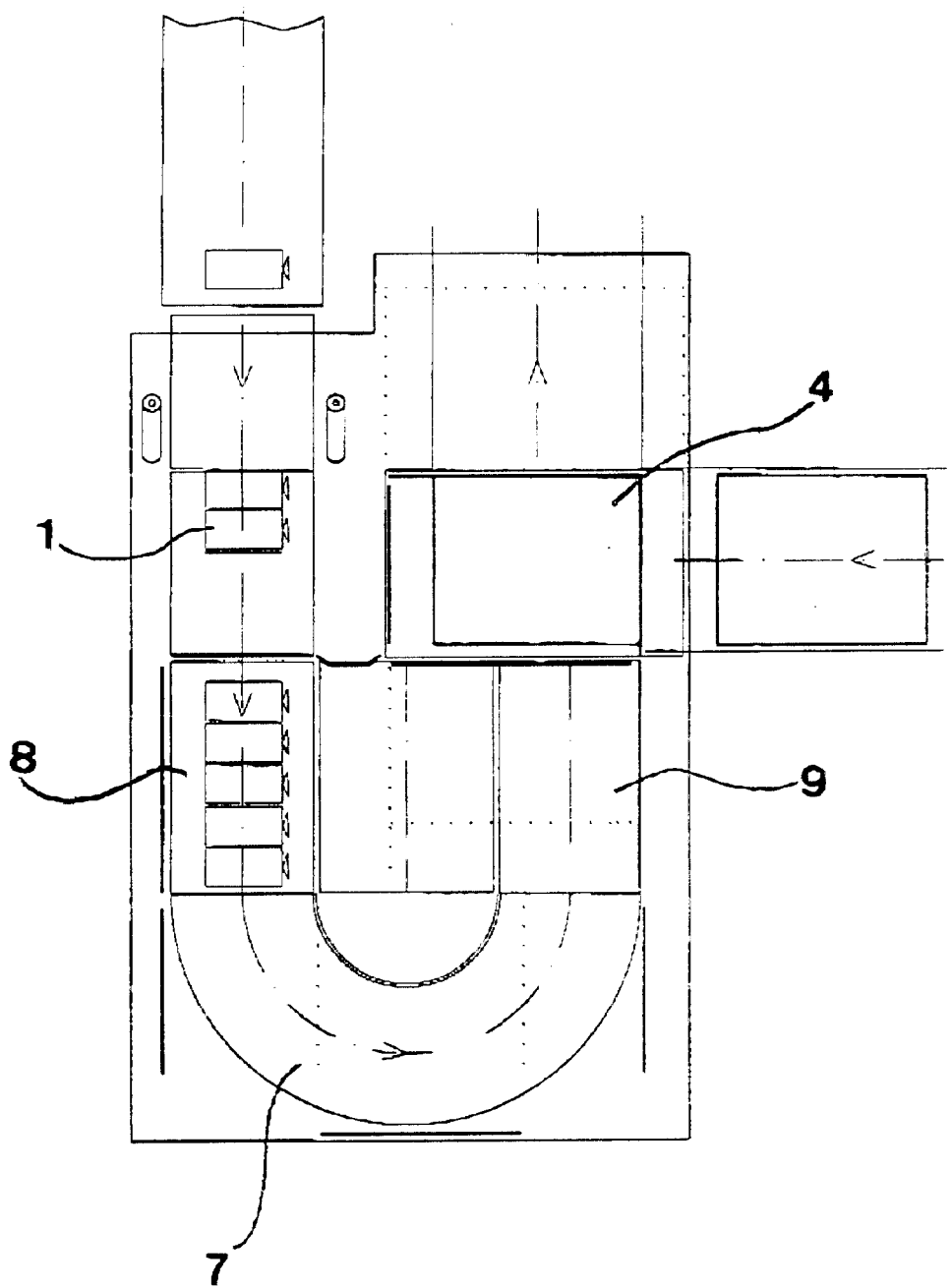
FIGS. 3a–3d are views corresponding to FIGS. 2a–2f of the same apparatus when controlled for obtaining a different loading pattern in said accumulation area.
Figure 3A:
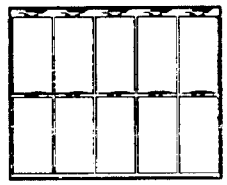
Figure 3B:
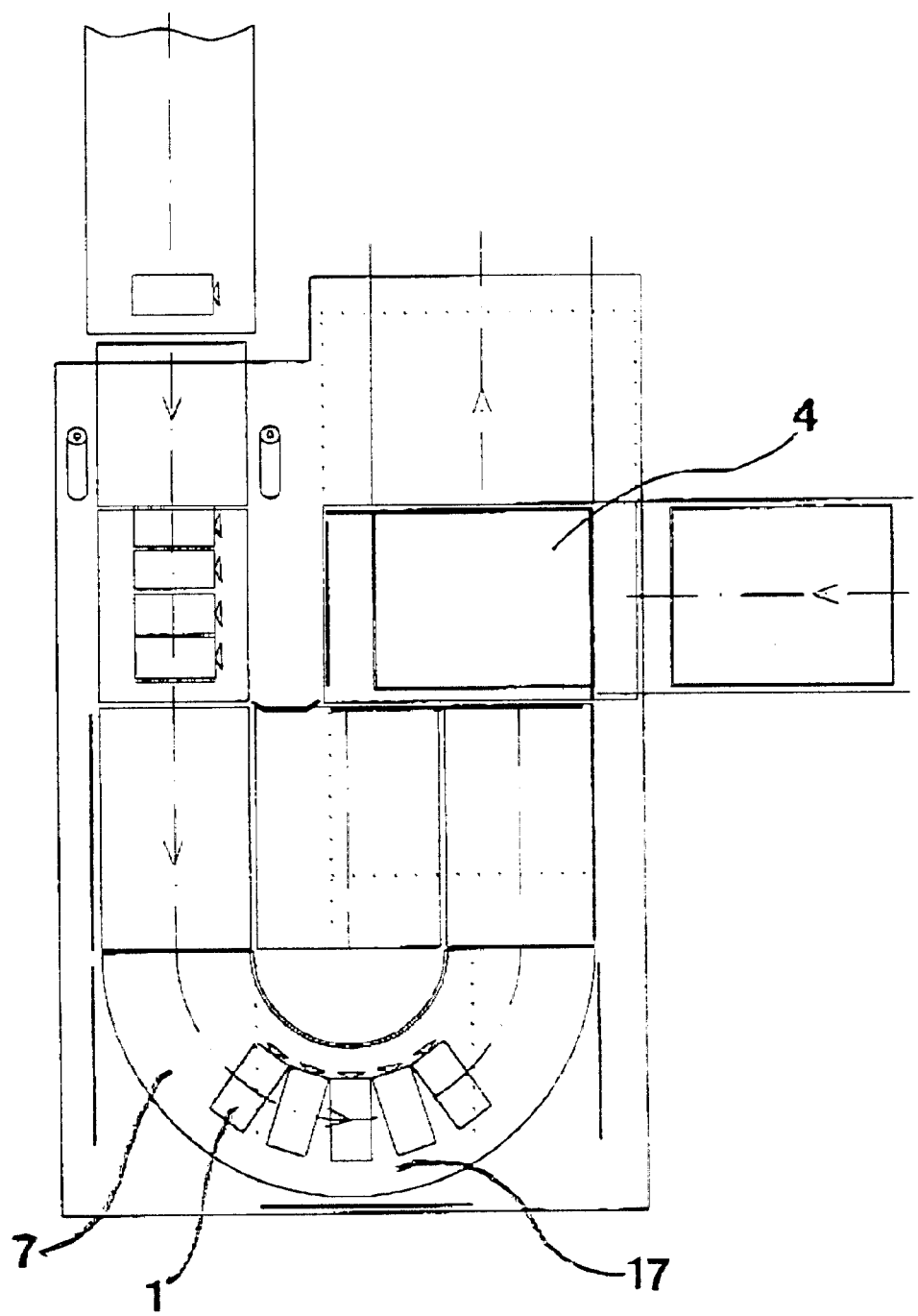
Figure 3C:
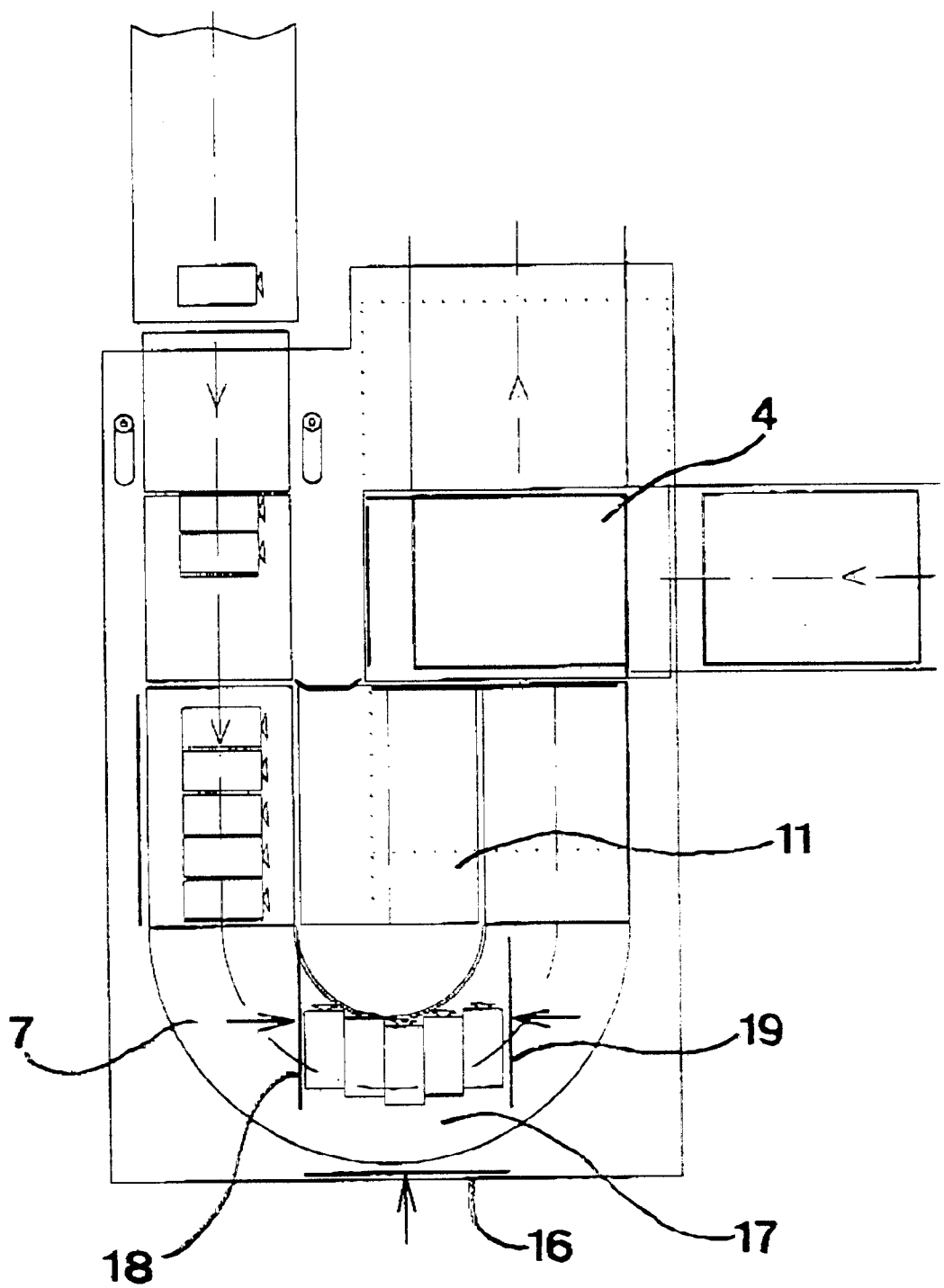
Figure 3D:
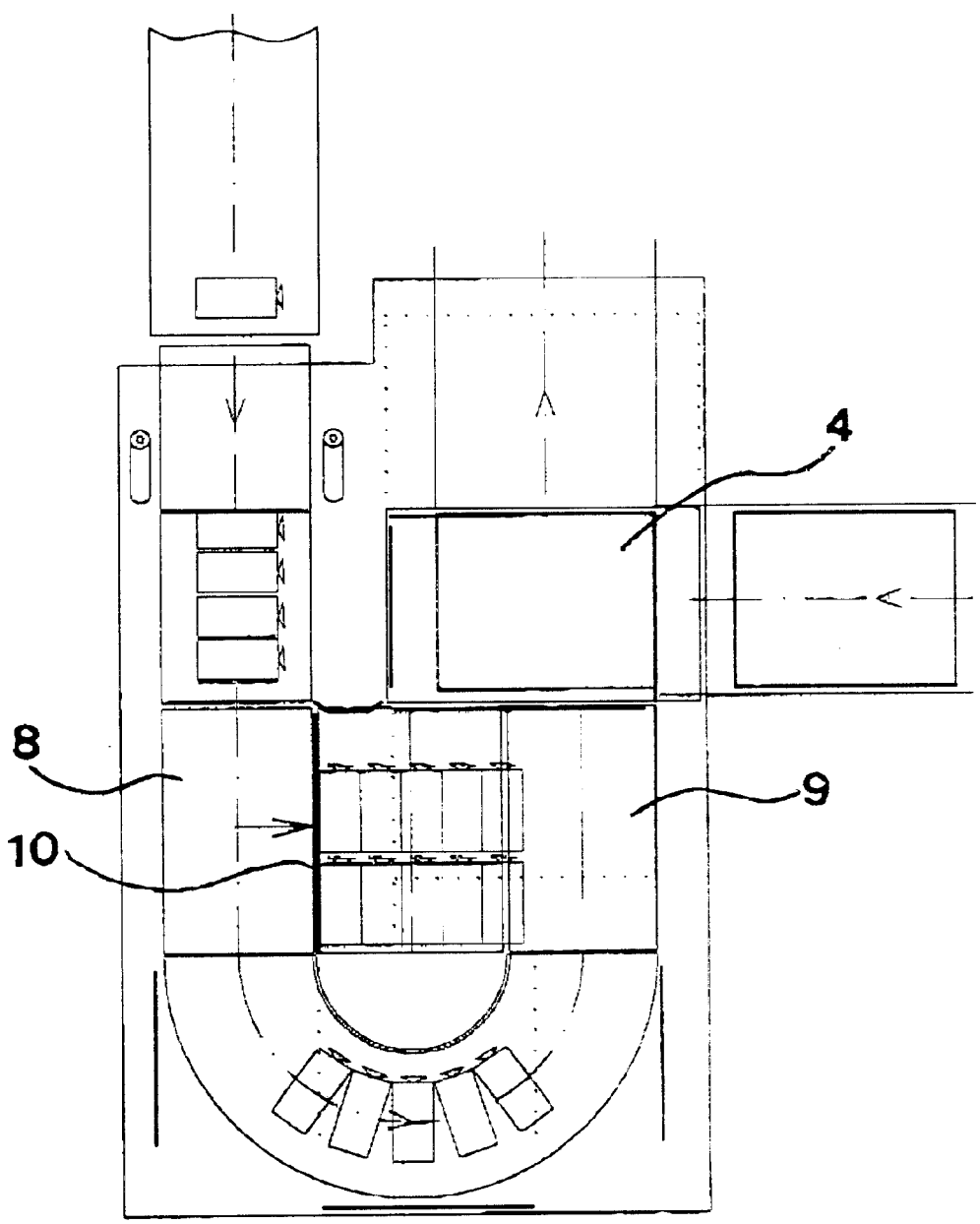

FIGS. 3a–3d are different views of the same apparatus when controlled to obtain the pattern of articles shown at the bottom of FIG. 3a in said accumulation area 4. Accordingly, the openings of the bags are directed in the same direction and all articles are turned by substantially 90 degrees with respect to the direction they have when they arrive to the first conveyor path section 8. It is shown in FIG. 3b and FIG. 3c how the pushers 18, 19 are moved together for gathering articles located in the mid-portion 17, whereupon the pusher 16 transfers these articles onto the intermediate support surface 11. FIG. 3e illustrates how this has been made twice, and it is evident how the method goes on by pushing the articles through the pusher 10 to the right as seen in FIG. 3d and then into the accumulation area 4 as illustrated in FIGS. 2d and 2e.

Figure 4:
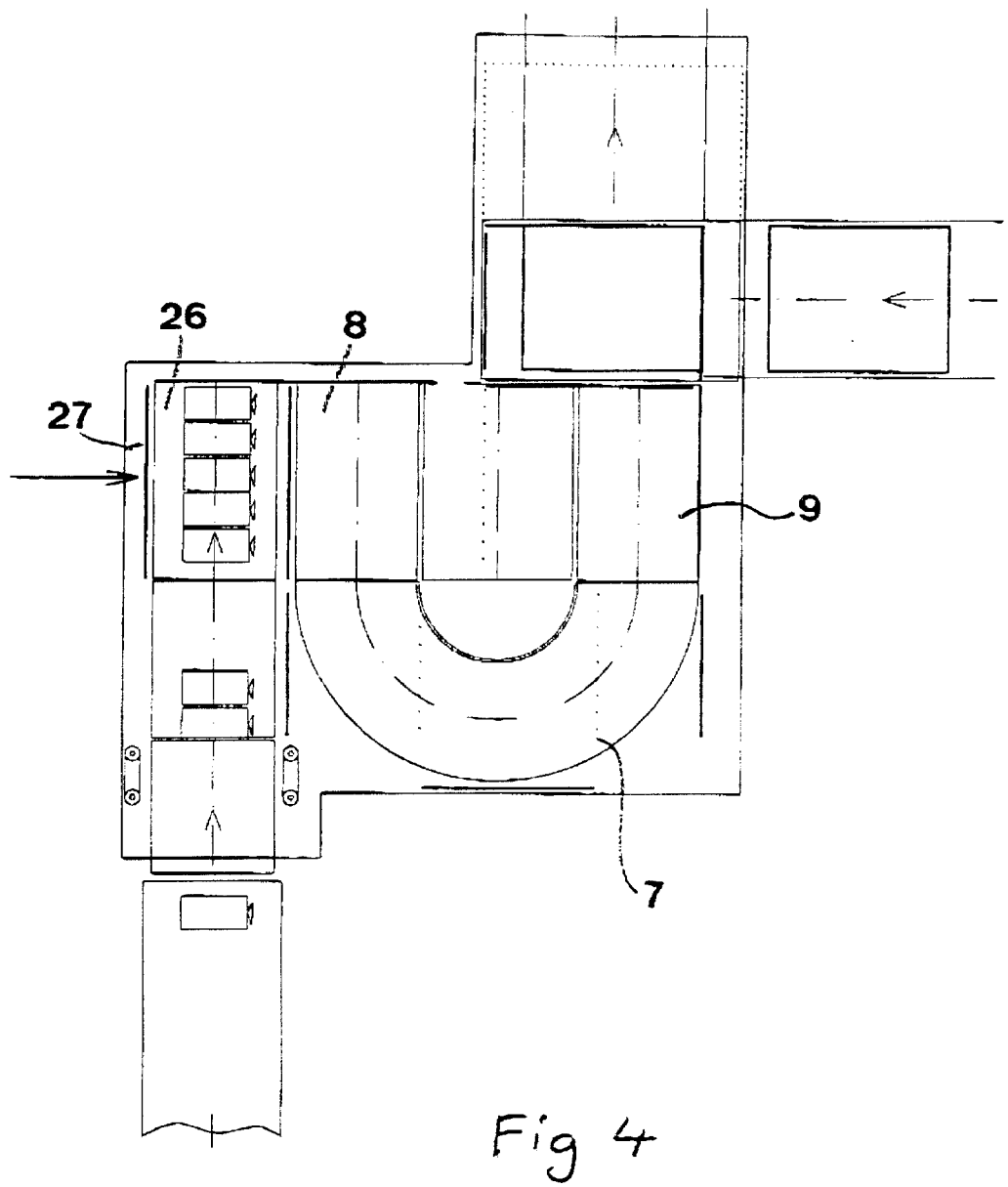
FIG. 4 is a view corresponding to FIG. 2a of an apparatus according to a second preferred embodiment of the invention.

Finally, FIG. 4 illustrates an apparatus according to another possible embodiment of the invention differing from the embodiment shown in FIGS. 2a–2f and FIGS. 3a–3d by the fact that the conveyor path upstream of said first conveyor path section 8 has a feeding direction being opposite to that of said first section. This means that an additional conveyor 26 and an additional pusher 27 for transferring the articles onto said first section 8 will be required. However, this layout of the apparatus may in some applications be preferred for considering the appearance of the premises in which the apparatus is to be placed.

The invention is of course not in any way restricted to the preferred embodiments thereof described above, but many possibilities to modifications thereof will be apparent to a man with ordinary skill in the art without departing from the basic idea of the invention as defined in the appended claims.

What is claimed is:

1. An apparatus for feeding articles to an accumulation area comprising at least one conveyor for feeding the articles forming a conveyor path to said area and means for optionally turning said articles by substantially 180 degrees for shifting end for end before the articles arrive to said accumulation area, wherein said conveyor path has a curved section interconnecting a first conveyor path section in the feeding direction upstream of the curved section and a second conveyor path section downstream thereof extending substantially in parallel with each other, the apparatus further comprising means for transferring said articles from said first section transversely to the feeding direction and over to said second section by-passing said curved section and a control arrangement adapted to control said transferring means to optionally transfer articles from the first to the second conveyor path section by-passing the curved section or letting them pass through the curved section, further comprising means for optionally accumulating articles conveyed through the conveyor path before the transversal transfer thereof by said transferring means for transferring a plurality of articles simultaneously, and said accumulation means comprises a separate conveyor of the conveyor path controllable to step-wise for accumulating a new article for each step.

2. An apparatus for feeding articles to accumulation area comprising at least one conveyor for feeding the articles forming a conveyor path to said area and means for optionally turning said articles by substantially 180 degrees for shifting end for end before the articles arrive to said accumulation area, wherein said conveyor path has a curved section interconnecting a first conveyor path section in the feeding direction upstream of the curved section and a second conveyor path section downstream thereof extending substantially in parallel with each other, the apparatus further comprising means for transferring said articles from said first section transversely to the feeding direction and over to said second section by-passing said curved section and a control arrangement adapted to control said transferring means to optionally transfer articles from the first to the second conveyor path section by-passing the curved section or letting them pass through the curved section, and comprising an intermediate conveyor arranged in a space separating said first and second section and having the same feeding direction as said second section.

3. An apparatus according to claim 2, wherein said transferring means is adapted to push the articles from said first section to said second section.

4. An apparatus according to claim 2, wherein the conveyor path is arranged to arrive to said first section through a part upstream thereof extending in substantially the same direction as the first section forming a prolongation thereof.

5. An apparatus according to claim 2, wherein said conveyor path is continued downstream of said accumulation area by a part extending in substantially the same direction as said second section.

6. An apparatus according to claim 2, wherein at least said first, second, and curved section of the conveyor path are formed by individually controllable conveyors.

7. An apparatus according to claim 2, wherein the conveyor path comprises individually controllable conveyors upstream of said first section as well as downstream of said accumulation area.

8. An apparatus according to claim 2, wherein it further comprises means for optionally accumulating articles conveyed through the conveyor path before the transfer thereof by said transferring means for transferring a plurality of articles simultaneously.

9. An apparatus according to claim 3, wherein said accumulation means is adapted to accumulate said articles in a zone in the feeding direction upstream of said first section.

10. An apparatus according to claim 2, wherein it further comprises means for transferring articles accumulated in said accumulation area into an area for loading them into a box.

11. An apparatus according to claim 10, wherein it is adapted to load elongated articles into said box.

12. An apparatus according to claim 10, wherein it is adapted to load bread according to desired patterns into a said box.

13. An apparatus according to claim 2, wherein it further comprises means for optionally turning said articles by substantially 90° before the articles arrive to said accumulation area.

14. An apparatus according to claim 13, wherein said means for turning by substantially 90 degrees is located in said conveyor path upstream of a region of said first section or downstream of a region of said second section for said transfer of articles by said transferring mans.

15. An apparatus according to claim 13, wherein said means for optionally turning articles by substantially 90 degrees is adapted to be controlled to form an obstacle to be hit by the articles thus turning them.

16. An apparatus according to claim 13, wherein said means for turning by substantially 90 degrees comprises an arm arranged laterally to the conveyor path and introducable into the conveyor path for being hit by said articles.

17. An apparatus according to claim 13, wherein said means for optionally turning said articles by substantially 90 degrees is operable to select turning direction, clockwise or counter-clockwise, for the articles.

18. An apparatus according to claim 17, wherein said means for optionally turning said articles by substantially 90 degrees comprises two members, one for turning clockwise and one for turning counter-clockwise, operable to optionally influence said articles to turn in opposite directions.

19. An apparatus for feeding articles to an accumulation area comprising at least one conveyor for feeding the articles forming a conveyor path to said area and means for optionally turning said articles by substantially 180 degrees for shifting end for end before the articles arrive to said accumulation area, wherein said conveyor path has a curved section interconnecting a first conveyor path section in the feeding direction upstream of the curved section and a second conveyor path section downstream thereof extending substantially in parallel with each other, the apparatus further comprising means for transferring said articles from said first section transversely to the feeding direction and over to said second section by-passing said curved section and a control arrangement adapted to control said transferring means to optionally transfer articles from the first to the second conveyor path section by-passing the curved section or letting them pass through the curved section, and further comprising additional means for optionally transferring articles being in a mid-portion of said curved section extending substantially perpendicularly to said first and second sections in a direction being substantially in parallel with said first and second sections onto an intermediate support surface separating said first and second sections.

20. An apparatus according to claim 19, wherein said additional means for optionally transferring articles is adapted to push said articles from said mid-portion to said intermediate support surface.

21. An apparatus according to claim 19, wherein it further comprises means for gathering articles located in said mid-portion by influencing them from both sides towards the center of said mid-portion in a direction substantially perpendicular to the extension of said first and second sections before transferring them to said intermediate support surface by said additional transferring means.

22. An apparatus according to claim 21, wherein said gathering means comprises two pushers.

23. An apparatus according to claim 19, wherein it comprises means for transferring articles from said intermediate support surface in a direction substantially perpendicular to the extension of said second section onto the latter.

24. A method for feeding articles to an accumulation area, in which the articles are optionally turned by substantially 180 degrees for shifting end for end before arriving to said accumulation area, wherein said articles are optionally either fed from a first conveyor path section to a curved section and through a second conveyor path section substantially in parallel with said first section and extending in the opposite direction thereto or transferred in a direction substantially transversely to the feeding direction of the first section from said first section to said second section by-passing said curved section, and said articles are optionally fed from a mid-portion of said curved section extending perpendicularly to said first and second sections in a direction being substantially in parallel with said first and second sections onto an intermediate support surface separating said first and second sections.

25. A method according to claim 24, wherein a plurality of said articles are gathered in said mid-portion by influencing them from both sides towards the centre of said mid-portion in a direction substantially perpendicular to the extension of said first and second sections and they are then simultaneously transferred to said intermediate support surface.

26. A method according to claim 24, wherein the articles are optionally accumulated before transferring them transversely for transferring a plurality of articles simultaneously.

27. A method according to claim 24, wherein said articles transferred to said intermediate support surface are transferred therefrom in a direction substantially perpendicular to the extension of said second section onto the latter.

28. A method according to claim 24, wherein the articles accumulated in said accumulation area are loaded into a box.

29. A method according to claim 28, wherein elongated articles are loaded into said box.

30. A method according to claim 28, wherein bread is loaded according to desired patterns into a said box.

31. A method for feeding articles to an accumulation area, in which the articles are optionally turned by substantially 180 degrees for shifting end for end before arriving to said accumulation area, wherein said articles are optionally either fed from a first conveyor path section to a curved section and through a second conveyor path section substantially in parallel with said first section and extending in the opposite direction thereto or transferred in a direction substantially transversely to the feeding direction of the first section from said first section to said second section by-passing said curved section, the articles are optionally accumulated before transferring them transversely for transferring a plurality of articles simultaneously, and said articles are moved stepwise for accumulating a new article for each step.

32. A method according to claim 31, wherein said articles are optionally turned by substantially 90 degrees before arriving to said accumulation area.

33. A method according to claim 32, wherein said articles are optionally turned by substantially 90 degrees in either turning direction, clockwise or counter-clockwise.

* * * * *